United States Patent [19]

Query

[11] Patent Number: 4,847,663

[45] Date of Patent: Jul. 11, 1989

[54] APPARTUS AND METHOD FOR REFLECTION FREE PHOTOGRAPHY

[76] Inventor: Frances L. Query, R.R. 1 - Box 316, Maroa, Ill. 61756

[21] Appl. No.: 190,534

[22] Filed: May 6, 1988

[51] Int. Cl.$^4$ .............................................. G03B 27/54
[52] U.S. Cl. ........................................ 355/70; 355/67
[58] Field of Search .................................... 355/67, 70

[56] References Cited

U.S. PATENT DOCUMENTS

| | | |
|---|---|---|
| 1,954,869 | 4/1934 | Fitch . |
| 3,375,752 | 4/1968 | Fairbanks et al. ...................... 355/70 |
| 3,402,636 | 9/1968 | Gemmer et al. ....................... 355/70 |
| 3,643,085 | 2/1972 | Durand . |
| 3,967,301 | 6/1976 | Corning . |
| 4,150,893 | 4/1979 | Ueno et al. . |
| 4,444,465 | 4/1984 | Giulie et al. . |

*Primary Examiner*—Monroe H. Hayes
*Attorney, Agent, or Firm*—Marshall, O'Toole, Gerstein, Murray & Bicknell

[57] ABSTRACT

A method and apparatus to quickly and efficiently photograph highly reflective items utilizing a copy camera. Light reflection off, and shadows from the object to be photographed, the surfaces of the copy camera, and nearby, photentially interfering objects are reduced to obtain reflection free photographs. A shadow box is placed around the object and covers are placed over the camera parts and between the lights and the object.

19 Claims, 3 Drawing Sheets

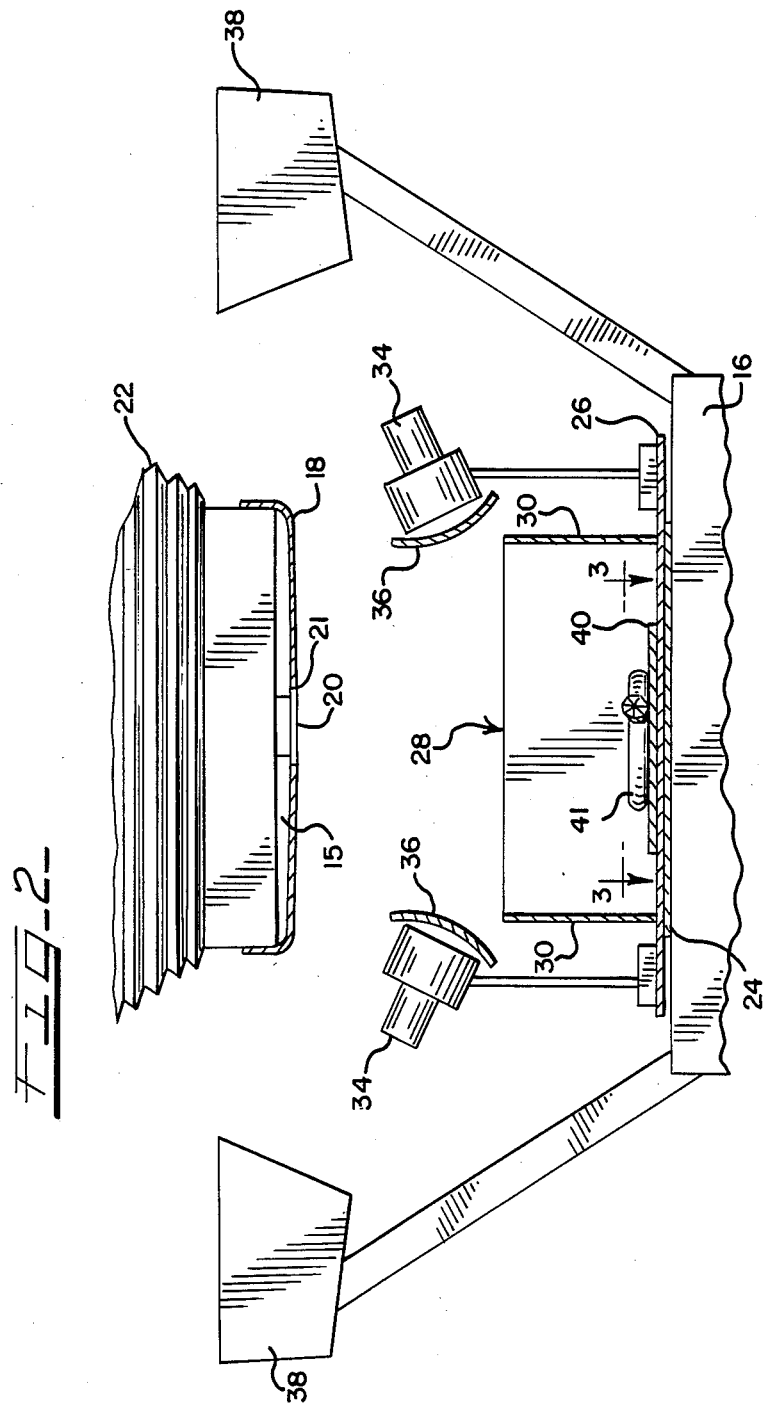

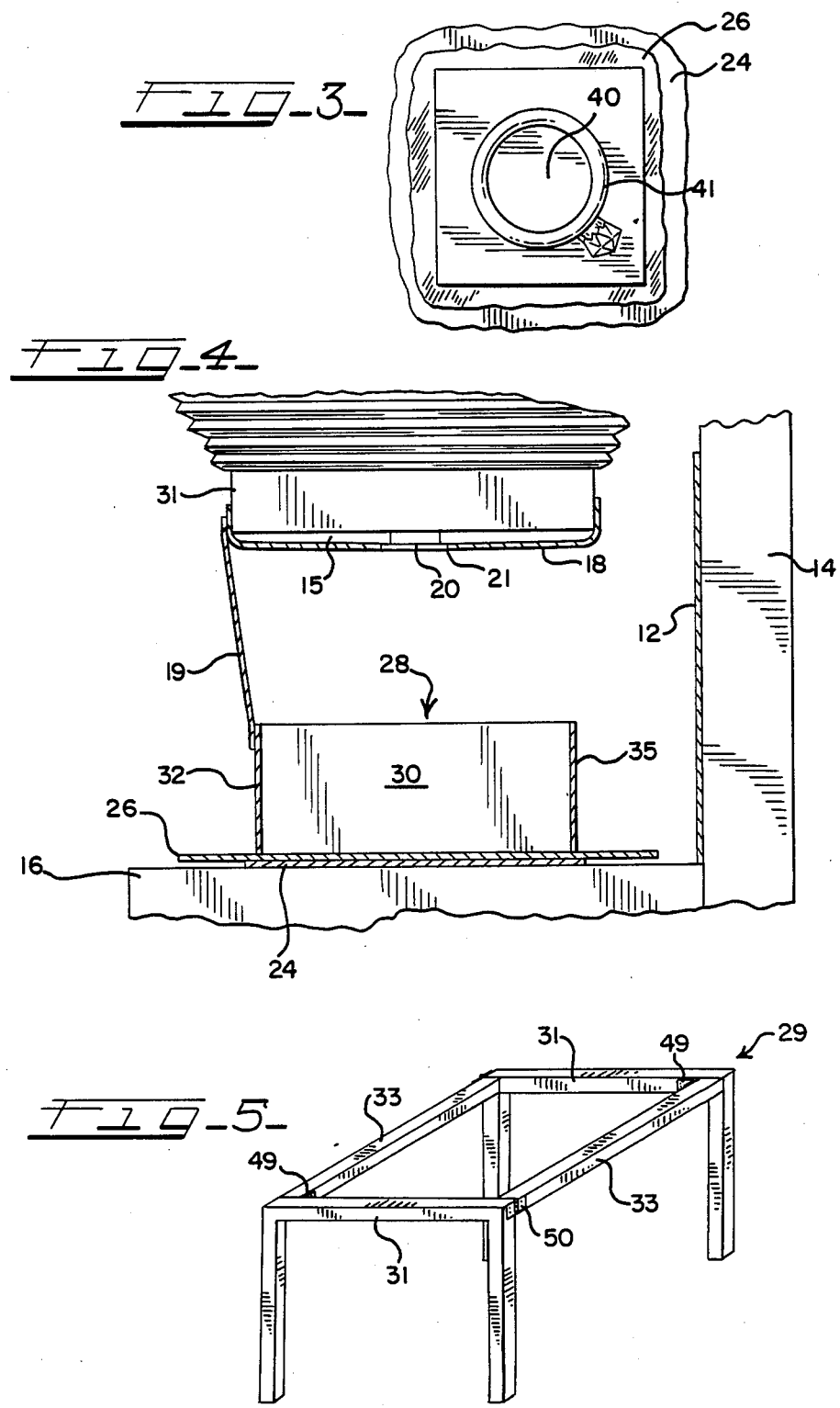

APPARATUS AND METHOD FOR REFLECTION FREE PHOTOGRAPHY

FIELD AND BACKGROUND OF THE INVENTION

This invention relates generally to photography, and more particularly to a method and apparatus for preventing black reflections on photographs when photographing highly reflective items.

In the past, taking photographs of highly reflective items, such as pieces of jewelry, has required much time and effort to take pictures free of black reflections. Highly reflective items cause black spots and shadows on pictures, as these items reflect into the camera lens the light used and needed for proper exposure. This exposure light reflection does not allow one to see the detail or highlights of diamond rings and other jewelry in finished photographs. Also, the reflection of exposure light off a watch crystal would not allow one to clearly see the details of a watch face. Therefore, makers of jewelry, jewelers, jewelry retailers, department stores, and anyone who uses photographs of jewelry or highly reflective items in their advertising brochures or elsewhere, all have a great need to take photographs of jewelry free from these reflections.

In the past, conventional cameras have been used to take photographs of these highly reflective items. The use of conventional cameras, however, requires much trial and error in the positioning of umbrellas and the positioning of lighting before a photograph can be taken that is relatively free of these reflections. This trial and error is very time consuming.

This invention utilizes copy cameras. In the past, copy cameras were seldom used in the photography of highly reflective items. This was due to the fact that copy cameras are primarily used for the reduction, enlargement or reproduction of two dimensional objects. Copy cameras are seldom used for photographing three dimensional objects. This non-use was also due to the fact that some copy cameras do not have a three dimensional focus adjustment mechanism on the camera, or the requisite lighting. If this lighting were added, this process would still be very time consuming because the lighting would constantly have to be repositioned until a photograph was found to be free of reflections.

It is a general object of this invention to provide an improved apparatus and method which avoids the foregoing problems of the prior art.

SUMMARY OF THE INVENTION

An improved apparatus in accordance with this invention takes reflection free photographs of highly reflective items and comprises, broadly, a standard copy camera whose external components are covered to make them essentially non-reflective, a shadow box which is used to diffuse the sharp copy camera exposure light and block reflections and shadows both from the copy camera and from nearby objects, and additional diffused lighting to expose, enhance and detail the item to be photographed.

An improved method utilizing the foregoing apparatus to take reflection free photographs of highly reflective items comprises, broadly, reducing copy camera surface reflection, reducing room object reflection, reducing reflection off the object being photographed, and diffusing the lighting needed for proper exposure.

BRIEF DESCRIPTION OF THE DRAWINGS

The foregoing and other objects, features and advantages of the invention will be more apparent from the following detailed description of an embodiment of the invention, as illustrated in the accompanying figures of the drawings, in which like reference characters refer to the same parts throughout the different views, wherein:

FIG. 2 is a front view, partially in section, of the apparatus;

FIG. 3 is a view taken on the line 3—3 of FIG. 2;

FIG. 4 is a side view of this apparatus; and

FIG. 5 is an illustration of an alternative construction of a shadow box of the invention.

DETAILED DESCRIPTION OF THE DRAWINGS

Figure 1:
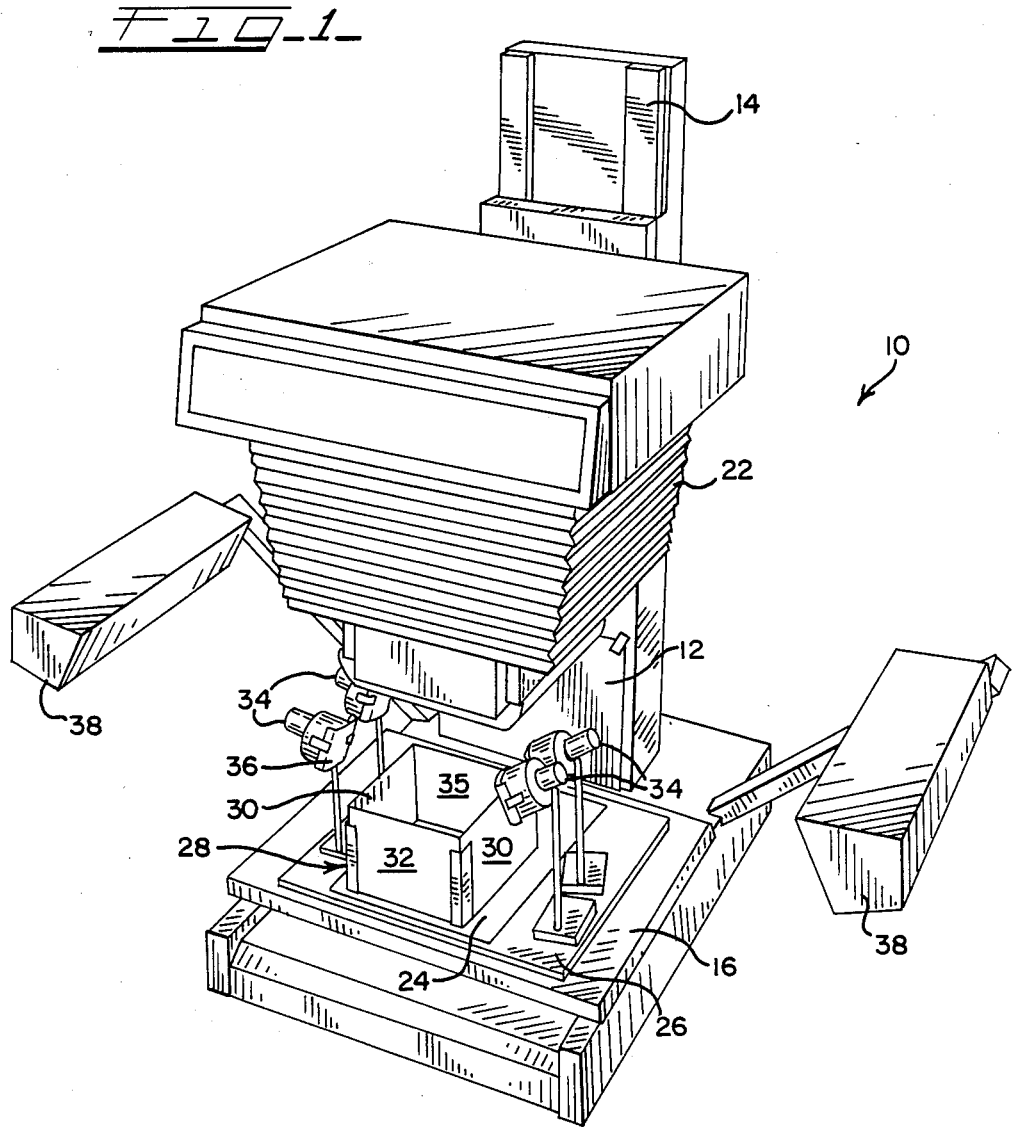
FIG. 1 is a perspective view of apparatus in accordance with this invention.

The present invention is accomplished by eliminating or minimizing reflections off any surface of the copy camera and by diffusing the lighting used and needed for proper exposure. The apparatus of this invention as shown in FIG. 1 is used in conjunction with a copy camera 10.

The copy camera 10 includes a bellows frame 14 which holds the camera bellows 22. A lens 20 (FIGS. 2 and 3) is located on the bellows underside 15. The copyboard 16, on which items to be photographed are placed, is located under the camera bellows 22 and at the bottom of the bellows frame 14. On top of the copyboard 16 is a copyboard glass 26. In the present specific examples of the invention, the copy camera is normally equipped with four 800 watt halogen lamps 38, two on each side of the copyboard, for exposing the item to be photographed.

To prevent light reflection off the surfaces of the copy camera, white sheets of paper or similar non-reflective mediums are placed on specific surfaces of the external components of the copy camera. More specifically, a white sheet of paper 12 (FIGS. 1 and 4) or similar material is attached to the bottom end of the bellows frame 14 of the copy camera behind the copyboard 16. A white sheet of paper 18 or similar material is attached to the underside of the camera bellows 22 as shown in FIGS. 2, and 4. Sheet 18 has an appropriate opening 21 to accommodate and not block the camera lens 20. Referring to FIGS. 2 and 4 a sheet of white paper 24 or similar material is placed under the copyboard glass 26 and on top the copyboard 16.

A shadow box 28 is placed in the center of and on top the copyboard glass. In the embodiment of the invention shown in FIGS. 1 and 2, the shadow box 28 is formed by four sheets of paper which are held together by strips of tape. The sheets of paper are arranged to form a square or rectangular box without a top or bottom, as shown best in FIG. 1. FIG. 5 shows an alternative construction including a collapsable frame 29 for better supporting the sheets of paper. The frame includes two three piece members 31. Each three piece member forms two legs and the top of one side of the shadow box frame. Each end of the top of the three piece member is attached by hinges to one end of two separate one piece members 33. Each one piece member forms a top of a side perpendicular to the sides formed by the three piece members. Two hinges 49 are at diagonally opposite corners in the inside of the top of the frame and two hinges 50 are at the other diagonally opposite corners on the outside of the top of the frame. The four hinges allow the frame to collapse and form a flat piece which can be easily stored. Sheets of paper (not shown in FIG. 5), which are similar to the paper used in the box 28, are fastened, using tape for example, to the inside of the frame and the legs to form a box similar to that shown in FIG. 1 (without a top or bottom).

With reference again to FIGS. 1, 2 and 4, the lateral sides 30 of the box 28, which are the sides perpendicular to the bellows frame, are constructed of drapes of white tissue paper of a type sufficient to diffuse the 800 watt lights 38 needed for proper exposure. Ten pound white tissue paper has been found sufficient to diffuse this lighting. This diffusion by the tissue paper makes the lighting softer and indirect and thereby minimizes the reflection off the object to be photographed that would occur with direct 800 watt lighting. The front side 32 and the back side 35 of the shadow box, which are parallel to the bellows frame, are both constructed of drapes of thicker opaque paper which is able to block light reflection off the copy camera surface and off any other nearby room object that may reflect any camera lighting.

The size of the shadow box varies depending on the size of the item to be photographed and the amount of light diffusion that is needed. Further four lamps 34 using 100 watt bulbs, two on each side of the shadow box, are placed adjacent the two sides 30 of the box. These lamps are used for detail and to make up for any of the 800 watt lighting that is needed but blocked by the tissue paper drapes of the lateral sides 30 of the shadow box. Each lamp 34 extends over the top rim of the box and is aimed at the article to be photographed. All four lamps are covered with tracing paper 36 to diffuse the light from these lamps. As seen in FIG. 4, when a small shadow box is used an opaque white sheet of paper 19 is normally hung from the front side of the bellows 37 to the top of the front side 32 of the box 28 to eliminate any reflections or shadows from nearby objects. This sheet may also be hung when using a larger shadow box.

To enhance photographic detail, a piece of orange paper 40, (FIGS. 2, 3 and 4) of a size slightly larger than the item such as a ring 41 to be photographed, may be placed in the center of the shadow box 28 and on top the copyboard glass 26.

The item 41 to be photographed is placed on the orange paper 40 in the center of the shadow box and the four 100 watt lamps are turned on and off concurrently with the copy camera's 800 watt lighting, and the item is photographed.

The following examples are presented to illustrate the applicability of the present invention for the intended purpose of taking reflection free photographs of highly reflective objects.

EXAMPLES

EXAMPLE I

Photographs of diamond rings were taken using apparatus of the present invention. An Agfa-Gevaert RPS 2024 superautomatic vertical camera was the copy camera used. The settings on this camera were as follows:

| Density - D-Max | 1.70 |
| --- | --- |
| Density - D-Min | 0.28 |
| Flash exposure Correction | 20-30% |
| Aperture | F11 |
| Lens | 305 |
| Contact screen | 85 line (30-40% density) |

The copy camera was also equipped with four 800 watt exposure lights 38.

An 18×24 inch white sheet of paper 24 was placed under the camera's copyboard glass. Another 18×24 inch white sheet of paper 18 was aligned under the camera bellows and a circular hole for the camera lens was cut. This cut paper was then taped to the underside of the camera bellows, making sure the camera lens was not blocked Then an 18×24 inch white sheet of paper 12 was taped to the bellows frame behind and above the copyboard. A shadow box 28 was then placed on top of the glass on the center of the copyboard. This box had the inside dimensions in inches of (length×width×height) 12×15×9½. The 15 inch sides were constructed of tissue paper. This corresponds to the sides of the shadow box which are perpendicular to the bellows frame. The 12 inch sides were constructed of 4 mil white paper. This corresponds to the front and back of the shadow box.

Four 17 inch adjustable desk lamps 34 with 100 watt bulbs were placed on the copyboard, two on each side of the shadow box. Each lamp was covered with no. 82 Morilla tracing paper. These lamps extended over the top rim of the box and were aimed at the diamond ring. Next a 20 pound medium color orange paper 40 was cut to a size slightly larger than the diamond ring 41. This orange paper was then placed in the center of the shadow box. Next the diamond ring was put on top of the orange paper in the shadow box.

Finally, the four desk lamps were turned on concurrently with the cameras 800 watt lighting to expose the film in the camera. Photographs were taken that were free of black refection. These photographs showed in great detail the diamond ring and its brilliance.

EXAMPLE II

Photographs of larger items requiring more light diffusion, such as chain jewelry, were also photographed using the present invention. The procedure and equipment of Example I were the same except for the following.

Several settings on the camera were changed from Example 1 for taking photographs of gold chains and were as follows:

| Density D-Min | 0.50 |
| --- | --- |
| Density D-Max | 0.10 |
| Flash exposure correction | 46-56% |

The shadow box employed also had larger dimensions. Its inside dimensions in inches were 18½×19½×15½ (length ×width×height). The four 17 inch desk lamps were placed on 6"×6"×9" cubes so they could extend higher over the top rim of the larger shadow box.

Photographs of the gold chain were taken. These photographs showed the chains in great detail and were free of reflections.

While the above described embodiments are in accordance with the present invention, it is understood that the same is not limited thereto, but is susceptible of numerous changes as known to a person skilled in the art, and therefore this invention is not limited to the details shown and described herein, but intended to cover all such changes and modifications as are obvious to one of ordinary skill in the art.

The present invention quickly and efficiently allows photographs of highly reflective items to be taken free of black reflections using a copy camera. The time needed to take such photographs is no longer totally unknown as in the prior art, as there is no need to experiment to remove these black reflections. In fact, it takes more time to place the item to be photographed in the shadow box of the invention than it does to take a satisfactory photograph. Thus the time and expense of operator experimentation for this type of photography is greatly reduced by this invention.

What is claimed is:

1. An improved apparatus to quickly and efficiently photograph highly reflective objects utilizing a standard copy camera having external components such as a camera body, a bellows, a bellows frame, a bellows underside, a copyboard, a copyboard glass, exposure lights, and a camera lens, said apparatus comprising:
   (a) a shadow box surrounding the object to be photographed and positioned on the copyboard glass, said box having a frame holding two parallel pairs of drapes, a front-back pair and a lateral sides pair, said front-back pair of parallel drapes being parallel to said bellows frame and being perpendicular to said lateral sides pair of parallel drapes; and said lateral sides pair of parallel drapes being capable of light diffusion and being situated between the exposure lights and the object being photographed;
   (b) said lateral sides pair of parallel drapes of said shadow box diffusing the exposure lights of said copy camera;
   (c) said front-back sides of said shadow box reducing light reflections off surrounding, potentially interfering objects;
   (d) a first non-reflective medium adapted to be attached to the bellows frame and face the object being photographed, said medium extending downwardly from the height level of the lens to the height level of the copyboard, and having a width at least as wide as the shadow box;
   (e) a second non-reflective medium adapted to be interposed between the copyboard glass and the copyboard, said second non-reflective medium being at least as large in area as the shadow box;
   (f) a third non-reflective medium adapted to be attached to the bellows underside, said third nonreflective medium having an area at least as large as the bellows underside and having an appropriate opening to accommodate the camera lens so that said lens is uncovered; and
   (g) said first, second and third nonreflective mediums reducing surface reflection off external components of said copy camera.

2. The apparatus of claim 1 wherein said first, second and third non-reflective mediums are constructed of white paper.

3. The apparatus of claim 1 wherein said front-back pair of drapes is constructed of opaque white paper and said lateral sides pair of drapes is constructed of tissue paper.

4. The apparatus of claim 1 including:
   (a) plurality of lamps, placed on said copyboard glass and adapted to pass light above said lateral sides pair of parallel drapes onto said highly reflective object to be photographed;
   (b) a plurality of diffusing mediums interposed between each of said lamps and said object to be photographed; and
   (c) an enhancing medium adapted to be located beneath said highly reflective object and on top of the copyboard glass, said enhancing medium being larger than the highly reflective object to be photographed.

5. The apparatus of claim 4 wherein said diffusing medium is mounted on said lamps and said diffusing medium is composed of tracing paper.

6. The apparatus of claim 4 wherein said plurality of lamps consists of four lamps positioned near the four intersections of the front-back and lateral sides pairs of parallel drapes.

7. The apparatus of claim 4 wherein said enhancing medium is a sheet of orange paper.

8. The apparatus of claim 1 including a reflection blocking medium adapted to be positioned from the bottom of the bellows frame to the front side of the shadow box, said reflection blocking medium being used to reduce light reflection off surrounding, potentially interfering objects.

9. The apparatus of claim 8 wherein said reflection blocking medium is a sheet of opaque white paper.

10. The apparatus of claim 1 where said shadow box frame further includes:
    (a) a front stand member and a back stand member each constructed of a left vertical leg and a right vertical leg, said legs being parallel to one another, and a crossbar perpendicular to the vertical legs connecting the tops of each said leg; and
    (b) a left single piece member and a right single piece member each having a front and back end;
    (c) said front end of the left single piece member being connected by a hinge to the crossbar over the left leg of the front stand member and said back end of said left single piece member being connected by a hinge to the crossbar over the left leg of the back side member;
    (d) said front end of the right single piece member being connected by a hinge to the crossbar over the right leg of the front stand member and said back end of said right single piece member being connected by a hinge to the crossbar over the right leg of the back side member;
    (e) said hinges allowing the frame to collapse for convenient storage.

11. A method for photographing highly reflective objects utilizing a standard copy camera having external components such as a camera body, a bellows, a bellows frame a bellows underside, a copyboard, copyboard glass, exposure lights, and a camera lens, including the steps of:
    (a) positioning a shadow box around the object to be photographed and on the copyboard glass, said shadow box having a frame for holding two parallel pairs of drapes, a front-back pair and a lateral sides pair, said front-back pair of parallel drapes being parallel to said bellows frame and being perpendicular to said lateral sides pair of parallel drapes, and positioned between the exposure lights and the object being photographed, said lateral sides pair of parallel drapes being capable of diffusing the exposure light;

(b) attaching a first non-reflective medium downwardly from the height level of the lens to the height level of the copyboard, said first non-reflective medium having a width at least as wide as the shadow box and facing the object being photographed;

(c) interposing a second non-reflective medium, at least as large in area as the shadow box, between the copyboard glass and the copyboard;

(d) attaching a third non-reflective medium, having an area at least as large as the bellows underside and having an appropriate opening to accommodate the camera lens so that said lens is uncovered, to the the bellows underside; and (e) the above steps reducing surface reflection off the external components of said copy camera, reducing reflection off of the highly reflective object being photographed, and reducing shadows and reflections eminating from the object being photographed and other surrounding, potentially interfering objects.

12. The method of claim 11 and further including attaching a reflection blocking medium from the bottom of the bellows frame to the front side of the shadow box to prevent any shadows or reflections off surrounding, potentially interfering objects.

13. The method of claim 12, where said reflection blocking medium is a sheet of opaque white paper.

14. The method of claim 11 and further including enhancing the photographic details of the object being photographed, which includes:

(a) passing light above said lateral sides pair of parallel drapes onto said object to be photographed, by placing a plurality of lamps on said copyboard;

(b) diffusing said light passed over the lateral sides pair of parallel drapes;

(c) interposing a colored sheet of paper at least larger than the object to be photographed between said object to be photographed and the top of the copyboard glass (d) the above steps enhancing the photographic detail of the object being photographed.

15. The method of claim 11 wherein said first, second and third non-reflective mediums are constructed of opaque white paper.

16. The method of claim 11 wherein said front-back pair of drapes is constructed of opaque white paper and said lateral sides pair of drapes is constructed of tissue paper.

17. The method of claim 14 wherein said diffusing includes mounting tracing paper on said lamps.

18. The method of claim 14 wherein said placing a plurality of lamps consists of placing four lamps near each of the four intersections of the front-back first and lateral sides pairs of parallel drapes.

19. The method of claim 12 wherein interposing includes using a sheet of orange colored paper.

* * * * *

UNITED STATES PATENT AND TRADEMARK OFFICE
CERTIFICATE OF CORRECTION

PATENT NO. : 4,847,663
DATED : July 11, 1989
INVENTOR(S) : Frances L. Query

It is certified that error appears in the above-identified patent and that said Letters Patent is hereby corrected as shown below:

On the cover page, change "APPARTUS" to --APPARATUS--;

On the cover page, "ABSTRACT" section, change "photentially" to --potentially--;

Col. 1, line 1, change "APPARTUS" to --APPARATUS--;

Col. 4, line 15, change "blocked" to --blocked.--;

Col. 5, line 56, change "nonreflective" to --non-reflective--;

Col. 8, line 12, change "glass" to --glass;--.

Col. 5, lines 51-52, change "nonre-flective" to --non-reflective--.

Signed and Sealed this

Twelfth Day of June, 1990

Attest:

HARRY F. MANBECK, JR.

*Attesting Officer*  *Commissioner of Patents and Trademarks*